(12) United States Patent
Rakers et al.

(10) Patent No.: US 6,763,996 B2
(45) Date of Patent: Jul. 20, 2004

(54) METHOD OF COMMUNICATION IN A RADIO FREQUENCY IDENTIFICATION SYSTEM

(75) Inventors: Patrick L. Rakers, Kildeer, IL (US); Timothy James Collins, Lockport, IL (US); Richard Stanley Rachwalski, Lemont, IL (US); Michael L. Bushman, Hanover Park, IL (US)

(73) Assignee: Motorola, Inc., Schaumburg, IL (US)

( * ) Notice: Subject to any disclaimer, the term of this patent is extended or adjusted under 35 U.S.C. 154(b) by 221 days.

(21) Appl. No.: 09/955,345

(22) Filed: Sep. 18, 2001

(65) Prior Publication Data

US 2003/0052161 A1 Mar. 20, 2003

(51) Int. Cl.$^7$ ............................................. G06F 17/00
(52) U.S. Cl. ........................................................ 235/375
(58) Field of Search ................................ 235/375, 380, 235/385, 387, 485; 340/572.1, 10.1, 568.1, 825.49

(56) References Cited

U.S. PATENT DOCUMENTS

| | | | | |
|---|---|---|---|---|
| 5,365,551 A | * | 11/1994 | Snodgrass et al. | 375/141 |
| 5,446,272 A | | 8/1995 | Barkan | |
| 5,742,237 A | * | 4/1998 | Bledsoe | 340/825.49 |
| 5,818,348 A | * | 10/1998 | Walczak et al. | 340/10.3 |
| 5,821,519 A | | 10/1998 | Lee et al. | |
| 5,822,714 A | * | 10/1998 | Cato | 702/108 |
| 5,841,770 A | * | 11/1998 | Snodgrass et al. | 370/346 |
| 5,883,582 A | * | 3/1999 | Bowers et al. | 340/10.2 |
| 5,959,285 A | | 9/1999 | Schuessler | |
| 5,963,134 A | * | 10/1999 | Bowers et al. | 340/572.1 |
| 6,104,333 A | * | 8/2000 | Wood, Jr. | 341/173 |
| 6,127,928 A | * | 10/2000 | Issacman et al. | 340/572.1 |
| 6,317,028 B1 | * | 11/2001 | Valiulis | 340/10.1 |
| 6,507,279 B2 | * | 1/2003 | Loof | 340/572.1 |
| 6,686,829 B1 | * | 2/2004 | Hohberger et al. | 340/10.1 |

* cited by examiner

Primary Examiner—Thien M. Le
Assistant Examiner—Edwyn Labaze
(74) Attorney, Agent, or Firm—Terri S. Hughes

(57) ABSTRACT

In accordance with the present invention, a radio frequency identification (RFID) device comprises a plurality of data fields. The RFID device transmits a data symbol from a data field, receives an acknowledgement symbol, and compares the transmitted data symbol to the received acknowledgement symbol. The RFID device repeats these steps until data transmission is complete as long as each transmitted data symbol is equivalent to a corresponding received acknowledgment symbol; otherwise, the RFID device maintains the data field from which the last data symbol was transmitted, and temporarily suspends data transmission. When the RFID receives a request for RFID devices temporarily suspended in a given data field to resume data transmission, if the given data field in the request is equivalent to the data field that was maintained, the RFID device repeats the steps above starting with the first symbol in the data field that was maintained.

14 Claims, 7 Drawing Sheets

| TAG | HEADER DATA | MANUFACTURER IDENTIFIER | PRODUCT IDENTIFIER | SERIAL NUMBER | |
|---|---|---|---|---|---|
| 1 | 01 | 0001 | 0001 | 0101 | —220 |
| 2 | 01 | 0001 | 0001 | 0000 | —221 |
| 3 | 01 | 0001 | 0001 | 1011 | —222 |
| 4 | 01 | 1010 | 0010 | 0110 | —223 |
| 5 | 01 | 0001 | 0011 | 0001 | —224 |
| 6 | 01 | 0000 | 0100 | 1100 | —225 |

METHOD OF COMMUNICATION IN A RADIO FREQUENCY IDENTIFICATION SYSTEM

FIELD OF THE INVENTION

The present invention relates generally to a method of communicating in a radio frequency identification system.

BACKGROUND OF THE INVENTION

In applications for identification of persons and things, optical bar coding technology is almost universally employed. Generation of the bar code is very inexpensive but limited. One problem associated with bar codes and bar code readers is that the bar codes must be precisely aligned with the bar code reader in order to be read. Another problem with bar codes is that the bar codes may become unreadable as a result of damage due to, for example, exposure to moisture, or wear and tear from use. Radio frequency identification ("RFID") tags address some of the shortcomings of bar codes and have been proposed as a replacement for optical bar codes in at least some applications. RFID tags used in bar code applications are sometimes referred to as electronic bar codes.

Remotely powered electronic devices and related systems for powering up and receiving stored information from such devices are well known. For example, U.S. Pat. No. 4,818,855 issued to Mongeon et al., titled, Identification System, discloses a remotely powered identification device which derives power from a remote source via one of an electric field or a magnetic field and which transmits stored information back to the source via the other of the electric field or magnetic field. Remotely powered identification devices of this type are commonly referred to as RFID tags. A power source with a data collection function is known as a tag reader. A power source capable of sending data to a tag is known as a tag writer. A power source capable of bi-directional communication is known as a tag reader/writer.

An ongoing objective in the development of RFID tags and associated readers and/or writers of the general type described above has been to minimize cost and size, and to improve efficiency of operation. The simplest and least expensive RFID systems employ unidirectional communication, allowing data transfer from tag to reader only. These are commonly known as read-only systems. In read-only systems, eliminating the need for a data receiver on the tag minimizes tag cost. Typically, these tags transmit information continuously as long as they receive adequate power from the source, wherein lies the primary system limitation. The reader's receiver is capable of reliably detecting data from only one tag at a time. If multiple tags are present within the reader's field, they will simultaneously transmit and create mutual interference at the reader's receiver, preventing the data from any one tag from being recovered successfully. This mutual interference condition is commonly referred to as a data collision. The terms anti-collision and collision mitigation are used to describe methods employed to prevent or minimize the impact of such data collisions at the reader.

Prior RFID systems have used the Aloha protocol for anti-collision. The Aloha protocol requires substantial bi-communication between the reader and the tags. This is undesirable from a tag complexity (cost) point of view. The Aloha protocol sorts through a population of RFID tags and assigns each tag a unique node address. This node address is subsequently used to provide collision free communication between the tags and the reader. The reader sends out a request command to all tags in the field. The tags react to the request command by selecting a random number. This random number defines the tag's channel identification or slot number. The reader polls the tags in the field looking for a response. The reader starts by polling for slot number 0. All tags that have chosen a random number of 0 respond. If exactly one tag responds, then the reader assigns a unique node address to that tag. If more than one tag responds, a collision will occur. The reader will ignore this indecipherable response. If no tags respond, the reader moves onto the next slot. This process continues by polling for slot number 1. Again, if a single response occurs, the tag is assigned a unique node address; otherwise, the polling sequence proceeds with the reader polling for the next slot number. Upon reaching the last slot, the reader can start over by requesting tags that have not been assigned a node address to select a new random number. The entire polling process is repeated until all tags in the field have been assigned unique node addresses. At this point, the reader can select an individual tag for subsequent communication by specifying its unique node address, providing a collision-free communication channel.

The problems with the Aloha protocol are the requirement for substantial bi-directional communication and the additional circuitry on the RFID device required to perform random number generation. It is desirable that a RFID device employs a low cost, simple circuitry. The requirements for a good tag receiver, a hardware random number generator, and protocol processing circuitry can double or triple the cost of the RFID device. It is readily apparent that a simpler more efficient method is required.

A second means for anti-collision involves arbitration. In an arbitration system, collisions are allowed. The reader acknowledges received data on a bit-by-bit basis effectively selecting which tag is to be read. The arbitration process starts with the reader issuing a start signal. All powered tags respond by transmitting their first bit. The reader uses a maximum likelihood detector to select a received bit (arbitration), and then acknowledges the reception of the received bit with a transmission to the tags. The reader transmits a one acknowledgement if a one was received and a zero acknowledgement if a zero was received. All tags that transmitted the acknowledged bit remain active. Tags that transmitted a bit that do not match the acknowledged bit become inactive and remain inactive until the next start signal is received. Active tags then transmit their next bit. The arbitration process is repeated. At each loop of the cycle, non-matching tags are inactivated. Eventually a single tag is completely read. The tag that was read stops participating in the arbitration process and all inactive tags become active upon reception of a new start signal. The process continues until all tags in the field have been read.

A typical arbitration system will read the data on all tags in the powering field in at least two times the amount of time required to transmit the data from the tags to the reader. This doubling of total elapsed time for data transmission results from the overhead of the acknowledgement signal. The elapsed time is important in applications in which read time may limit throughput, such as when tagged items must be read on a moving conveyor system.

Thus, there exists a need for providing a method and apparatus that fosters efficient communication between a reader and a plurality of tags in a RFID system.

BRIEF DESCRIPTION OF THE FIGURES

A preferred embodiment of the present invention is now described, by way of example only, with reference to the accompanying figures, in which.

| List of Acronyms | |
|---|---|
| ACK SYM | Acknowledgement Symbol |
| HS | Header Suspend |
| HT | Header Transmit |
| MS | Manufacturer Suspend |
| MT | Manufacturer Transmit |
| PS | Product Suspend |
| PT | Product Transmit |
| RFID | Radio Frequency Identification |
| SS | Serial Number Suspend |
| ST | Serial Number Transmit |
| TX SYM | Transmitted Symbol |

DESCRIPTION OF THE PREFERRED EMBODIMENT

The present invention improves the efficiency of communication between a tag and a reader in a radio frequency identification ("RFID") system. The present invention is applicable to capacitive-coupled (i.e., electrostatic) RFID systems, inductive-coupled (i.e., electromagnetic) RFID systems, combination capacitive/inductive-coupled RFID systems, and the like.

Figures 1, 2:
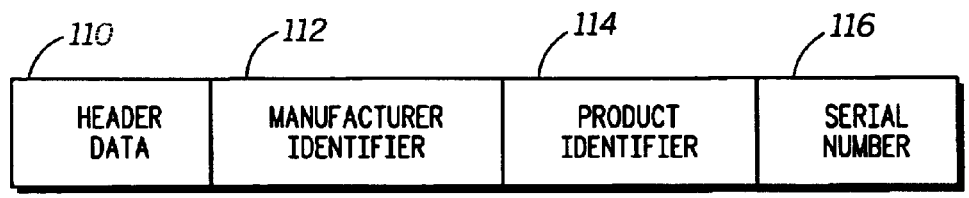
FIG. 1 is an example of an electronic bar code format in accordance with the present invention.
FIG. 2 is an example of a plurality of RFID tags with data conforming to the electronic bar code format of FIG. 1 in accordance with the present invention.

FIG. 1 illustrates an example of a possible electronic bar code data format. In accordance with the present invention, an electronic bar code 100 is partitioned into a plurality of binary data fields that may include, but is not limited to, header data 110, a manufacturer identifier 112, a product identifier 114, and a serial number 116. The length of each data field may be standardized, and could be as small as a single bit. In the preferred embodiment, the header data 110 is an eight-bit field, the manufacturer identifier 112 is a twenty-four-bit field, the product identifier 114 is a thirty-two-bit field, and the serial number 116 is also a thirty-two-bit field for a total of ninety-six-bits of electronic bar code data, however, for the examples described herein, the length of the data fields are shorter than the preferred lengths for ease of explanation.

FIG. 2 illustrates an example of how electronic bar codes 100 are assigned to an item. Information related to tag 1 is shown in row 220 of table 200. Information related to tags 2, 3, 4, 5, and 6 are shown in rows 221, 222, 223, 224, and 225, respectively. In this example, the header data 110 is the same for all tags. The header data 110 represents a version number identifier for the electronic bar code 100; all electronic bar codes having common header data 110 have the same format.

A unique manufacturer identifier 112 is assigned to each manufacturer. All products from a single manufacturer have the same manufacturer identifier 112. As illustrated in FIG. 2, table 200 includes four items (tags 1–3 and 5) by a first manufacturer (i.e., manufacture identifier 0001). As a result, identical manufacturer identifiers 112 are found in rows 220–222 and row 224. A second manufacturer (i.e., manufacturer identifier 1010) and a third manufacturer (i.e., manufacturer identifier 0000) are also assigned unique manufacturer identifiers 112 as reflected in rows 223 and 225, respectively. An agency responsible for the unique assignment of electronic bar codes, similar to the Uniform Code Council for optical bar codes, handles the assignment of manufacturer identifiers 112. Preferably, each manufacturer assigns its items a product identifier 114, and a serial number 116.

Figure 3:
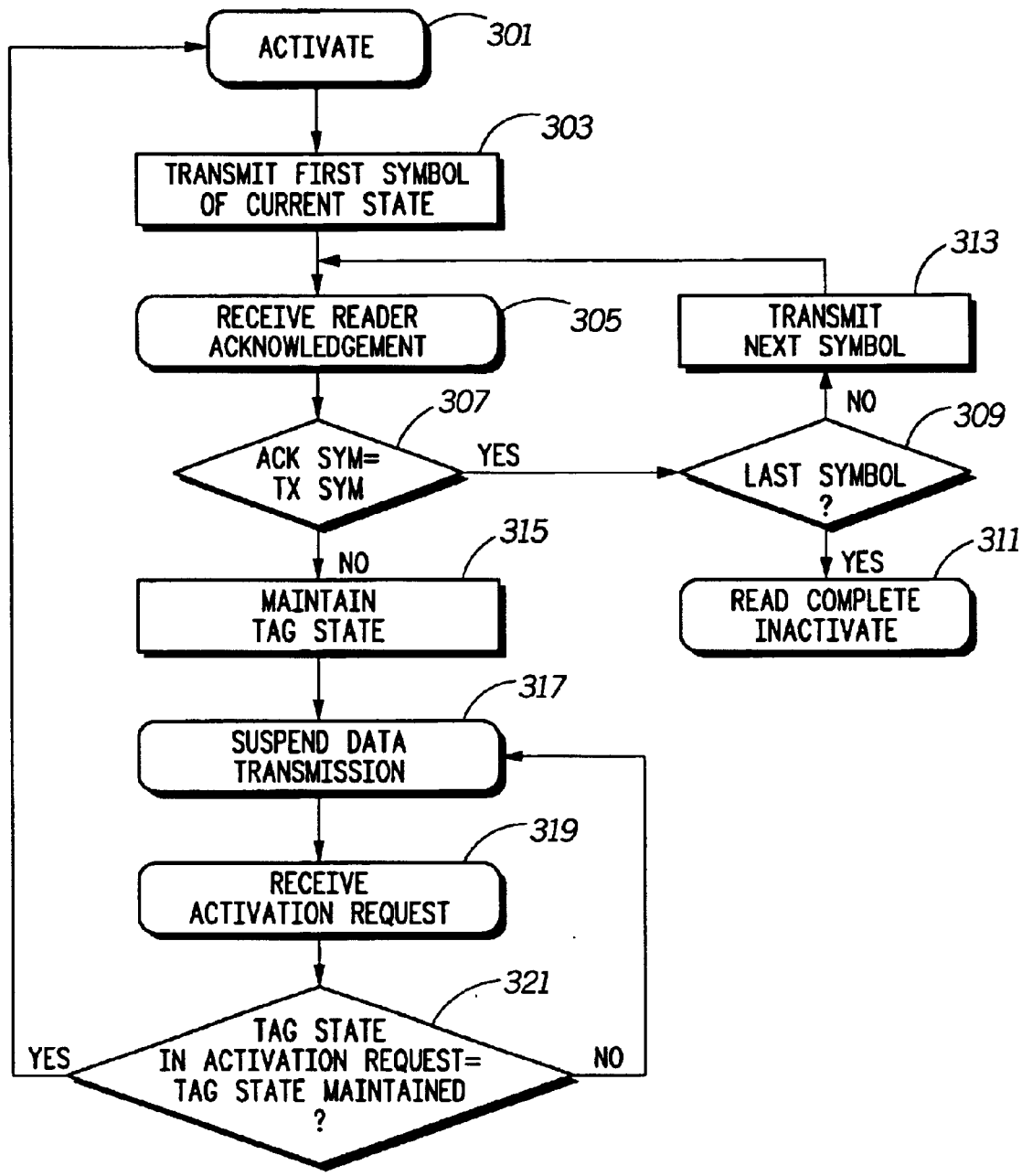
FIG. 3 is a flow diagram of an RFID tag in accordance with the present invention.

The flow diagram of FIG. 3 illustrates the functionality of an RFID tag, according to the present invention, which is capable of being read in an efficient manner when multiple RFID tags are simultaneously in an excitation field. In accordance with the present invention, the excitation field powers the RFID tag for communication with a reader. Typically, the reader transmits the excitation field, however, it can be transmitted from another device. For purposes of the present invention, it is assumed that the reader transmits the excitation field.

In operation, the present invention begins when the tag receives a request to activate and transmit data if suspended in a given state (step 301). Tag states are discussed below in detail with reference to FIG. 4. It should be noted that, in the preferred embodiment, the current state of the tag is directly related to the data field currently being read or the data field that needs to be read by the reader; as such, the terms "tag state" and "data field" are used interchangeably throughout the discussion.

Returning to the discussion of FIG. 3, the tag activates if its current state is equivalent to the requested state. Once activated, the tag transmits a first symbol ("TX SYM") from its current data field to the reader (step 303). After transmitting the first symbol, the tag awaits reception of an acknowledgement symbol ("ACK SYM") from the reader (step 305). The ACK SYM indicates the polarity of the symbol detected by the reader. The ACK SYM may take the form of a single bit echoed by the reader, or the ACK SYM may comprise a more complex symbol that is recognized by the tag as representing a specific polarity. Upon reception of the reader's acknowledgement, the tag compares the set of data represented in the ACK SYM received in step 305 with the set of data represented by the TX SYM in step 303 (step 307). If the sets of data are equivalent, the tag determines if data transmission is complete (step 309). If data transmission is complete, the tag enters a SLEEP state, in which all data transmission ceases (step 311). After the tag enters the SLEEP state, the tag can only be activated if power is removed from the tag and subsequently reapplied.

If the tag determines that data transmission is incomplete (step 309), it transmits its next symbol of data to the reader (step 313). After the next symbol of data is transmitted, the process loops back to step 305, and the tag once again waits for an ACK SYM from the reader and the process continues as described above. Thus, when a tag is being successfully read and acknowledged, the tag loops repeatedly through steps 313, 305, 307, and 309 until all of its data is successfully transmitted and acknowledged by the reader. If at any pass through this loop, the set of data represented by the ACK SYM [ath0221] is not equivalent to the set of data represented by the TX SYM in step 307, the tag maintains its current data field (step 315) and enters a suspended state (step 317) during which data transmission is suspended temporarily. In accordance with the preferred embodiment of the present invention, the tag only maintains its current data field and state if it remains in the excitation field of the reader, however, this may vary depending on the application. Once suspended, the tag is re-activated if it receives a request from the reader to re-activate all tags in the state (data field) that was maintained in step 315 (steps 319 & 321).

Figure 4:
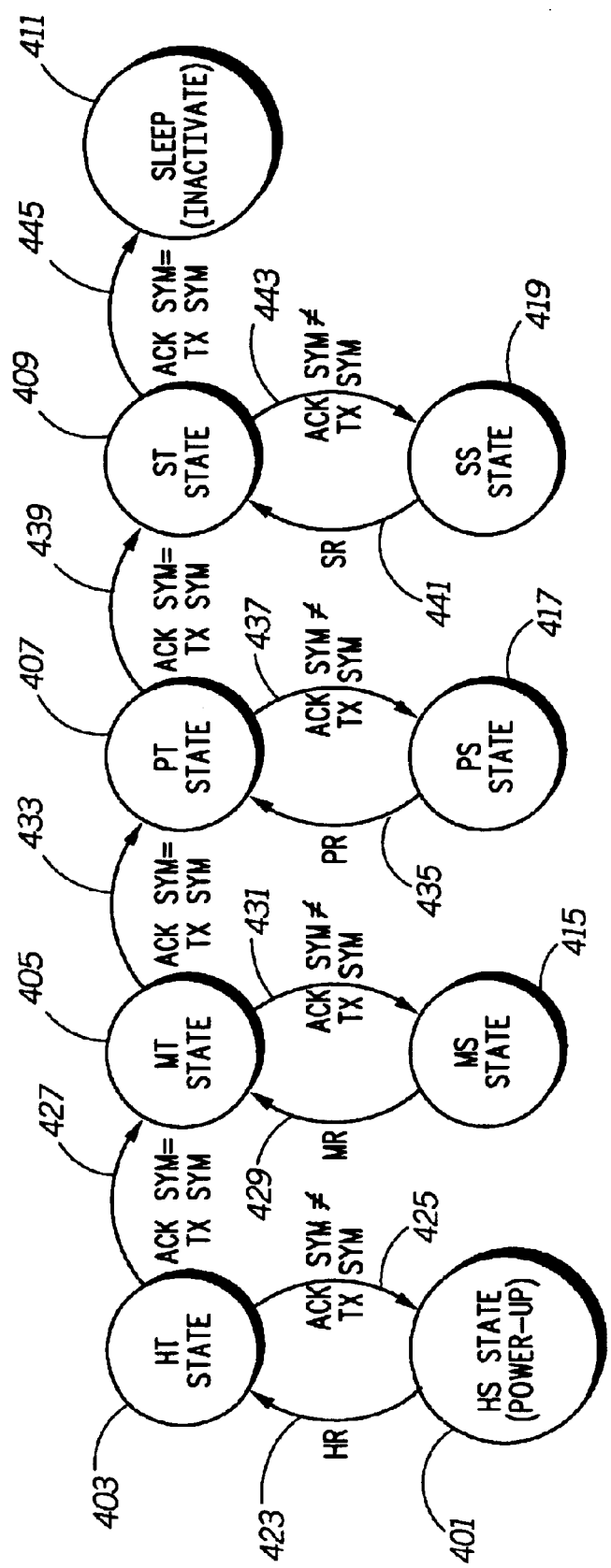
FIG. 4 is a state diagram of an RFID tag in accordance with the present invention.

FIG. 4 illustrates a state diagram for an RFID tag conforming to the electronic bar code format of FIG. 1. In the preferred embodiment, there are nine states that the tag can enter: a header suspend ("HS") state 401, a header transmit ("HT") state 403, a manufacturer suspend ("MS") state 415, a manufacturer transmit ("MT") state 405, a product suspend ("PS") state 417, a product transmit ("PT") state 407, a serial number suspend ("SS") state 419, a serial number transmit ("ST") state 409, and a SLEEP state 411. Preferably, in the HT state, the MT state, the PT state, and the ST state, data transmission is active; in the HS state, the MS state, the PS state, and the SS state, data transmission is temporarily suspended; and in the SLEEP state, data transmission is ceased.

In accordance with the preferred embodiment, when the RFID tag enters the excitation field, it initializes in the HS state 401 at power-up. While in the HS state 401, the tag does not transmit any data. The tag remains in the HS state 401 until the reader requests tags in the HS state 401 to become active via a header request 423. In the preferred embodiment, the RFID tag can only change its state in response to a reader command (e.g., a header request 423) or as a result of a tag transmit/reader acknowledgement comparison (e.g., ACK SYM=TX SYM). These events are marked along arrows in the state diagram in standard state diagram format.

In the HT state 403, the tag transmits its header data 110 to the reader as described above with reference to FIG. 3. If at any time during the transmission of the header data 110 in the HT state 403, the data represented by the ACK SYM is not equivalent to the data represented by the TX SYM 425 (i.e., ACK SYM≠TX SYM), the RFID tag moves from the HT state 403 to the HS state 401 and becomes temporarily suspended in the HS state 401. The tag remains suspended in the HS state 401 until the tag receives a header request 423 issued by the reader requesting all tags in the HS state 401 to re-activate, at which point the tag resumes data transmission beginning with transmission of the first symbol of its header data 110. If the header data 110 is successfully transmitted to, and acknowledged by, the reader, the tag transitions from the HT state 403 to the MT state 405, where ACK SYM=TX SYM 427 indicates that the data represented by the ACK SYM is equivalent to the data represented by the TX SYM.

In the MT state 405, the tag transmits its manufacturer identifier, preferably on a per symbol basis. If the data represented by the ACK SYM is not equivalent to the data represented by the TX SYM from the manufacturer identifier at any time, the tag transitions to the MS state 415 where the tag becomes temporarily suspended until the tag receives a manufacturer request 429 issued by the reader requesting tags in the MR state 415 to re-activate, at which point the tag resumes data transmission beginning with transmission of the first symbol of its manufacturer identifier 112. If, however, the reader properly acknowledges all manufacturer identifier symbols transmitted by the tag, then the tag advances to the PT state 407.

In the PT state 407, the tag transmits its product identifier, preferably on a per symbol basis. If the data represented by the ACK SYM is not equivalent to the data represented by the TX SYM from the product identifier at any time, the tag transitions to the PS state 417 and becomes temporarily suspended until the tag receives a product request 435 issued by the reader requesting tags in the PS state 417 to re-activate, at which point the tag resumes data transmission beginning with transmission of the first symbol of its product identifier 114. If, however, the reader properly acknowledges all product identifier symbols transmitted by the tag, then the tag advances to the ST state 409.

In the ST state 409 the tag transmits its serial number, preferably on a per symbol basis. If the data represented by the ACK SYM is not equivalent to the data represented by the TX SYM from the serial number at any time, the tag transitions to the SS state 419 and becomes temporarily suspended until the tag receives a serial number request 441 issued by the reader requesting RFID tags in the SS state 419 to re-activate, at which point the tag resumes data transmission beginning with transmission of the first symbol of its serial number 116. If, however, the reader properly acknowledges all serial number symbols transmitted by the tag, then the tag advances to a SLEEP state 411.

Upon reaching the SLEEP state 411, the tag has successfully transmitted all of its data to the reader, and data transmission is halted. The tag remains in the SLEEP state 411 until power is removed from the tag and subsequently re-applied.

Thus, if the data represented by the ACK SYMs is equivalent to the data represented by the TX SYMs, the tag continues to transmit its data and transition from one state to the next until the reader successfully acknowledges all of its symbols. If, however, the data represented by the ACK SYMs is not equivalent to the data represented by the TX SYMs, the tag is temporarily suspended in its current state (data field) until the tag receives a request from the reader to re-activate its current state.

Figure 5:
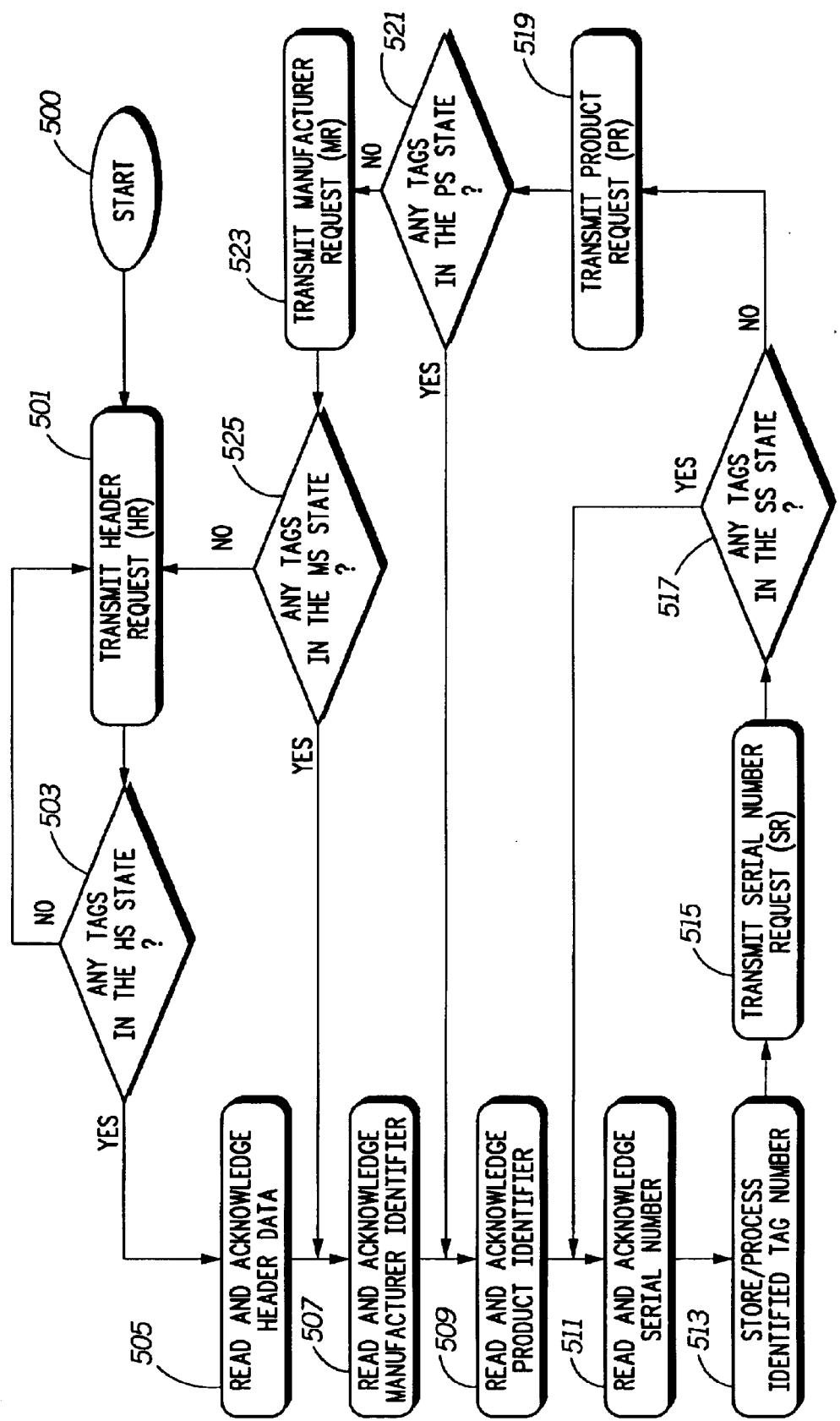
FIG. 5 is a flow diagram of an RFID reader in accordance with present invention.

Thus far, the figures and examples of the present invention have been focused on the tag, and how it functions with respect to the reader. Let us now turn the discussion of the present invention to the reader, and how it functions with respect to the tag. FIG. 5 illustrates a flow diagram for the reader in the RFID system in accordance with the preferred embodiment of the present invention. The reader process starts when the reader transmits the excitation field (not shown) to power the tags. After a time has elapsed, the reader transmits a header request 423 to activate all tags present in the excitation field that are in the HS state 401, if any (steps 501 & 503). In the preferred embodiment, this is accomplished by listening for tag transmissions for a predetermined period of time after sending the header request 423. If the reader does not detect the presence of any tags in the HS state 401, it can re-transmit the header request 423 until a response is received.

In the preferred embodiment, the reader reads and acknowledges symbols from the header data 110 (step 505), the manufacturer identifier (step 507), the product identifier (step 509), and the serial number (step 511) of an electronic bar code, resulting in a first tag being successfully read in its entirety. The reader copies data from the electronic bar code it successfully read and acknowledged into memory and/or passes the data along to a processor that manipulates or evaluates the data (step 513).

It is important to note that if there were a plurality of tags simultaneously present in the excitation field, the tags that were not successfully read and acknowledged by the reader in their entirety were temporarily suspended in various states (as described in FIG. 4) when their transmitted data symbol was not acknowledged by the reader. The following discussion addresses how the reader successfully reads and acknowledges the electronic bar codes of the remaining tags that were temporarily suspended in various states in an efficient manner.

Once the reader successfully reads and acknowledges an entire electronic bar code of any given tag, the reader preferably polls a set of tags whose data transmission is closest to being completed (i.e., successfully read and acknowledged in its entirety) by transmitting an activation request. In this example, the reader re-activates a set of tags that were suspended in the SS state 419, if any, by transmitting a serial number request 441 (step 515). In the preferred embodiment, this is accomplished by listening for tag transmissions for a predetermined period of time after sending the serial number request 441 (step 517). If there are tags that were suspended in the SS state 419, the reader receives at least a first set of symbols, and acknowledges each set of symbols from the serial number data field until an electronic bar code is successfully read and acknowledged (step 511) in its entirety.

The reader copies and/or processes the data (step 513) of the successfully read and acknowledged electronic bar code, and transmits another serial number 441 (step 515) to activate any remaining tags suspended in the SS state 419. The process of steps 511, 513, 515 and 517 continues to loop until all tags that were previously suspended in the SS state 419 are successfully read and acknowledged by the reader. At this stage, the reader has successfully read and acknowledged all tags with electronic bar codes having a first header data, a first manufacturer identifier, and a first product identifier.

When the reader determines that all tags in the SS state 419 have been successfully read and acknowledged (step 517), if any, the reader preferably re-activates the next set of tags. In this example, the reader re-activates all tags suspended in the PS state 417, if any, by transmitting a product request 435 (step 519). If there are tags that were suspended in the PS state 417 (step 521), the reader reads and acknowledges symbols from the product identifier data field (step 509) and from the serial number data field (step 511) until an entire electronic bar code is successfully read and acknowledged (step 513). At this stage, the reader has successfully read the electronic bar code from the first tag having a first header data, a first manufacturer identifier and a second product identifier.

As before, the reader copies and/or processes the electronic bar code (step 513) that was successfully read and acknowledged, and transmits a serial number request 441 (step 515) to activate any remaining tags with the second product identifier which were suspended in the SS state 419. This process of steps 509–521 continues to loop, with branching as required at step 517, until the reader has successfully read and acknowledged all tags that were previously suspended in the PS state 417; at this stage, all tags with electronic bar codes having a first header data, and a first manufacturer identifier have been read.

After successfully reading and acknowledging all the tags that were previously suspended in the PS state 417 and the SS state 419, the reader re-activates any tags suspended in the MS state 415 by transmitting a manufacturer request 429 (step 523). As described previously with reference to other suspended states, the reader continues to loop around steps 507–525, with branching as required at steps 517 and 521 until all of the tags suspended in the MS state 415, the PS state 417 and the SS state 419 have been successfully read and acknowledged. At this stage, the reader has read all tags with electronic bar codes having a first header data. When there are no tags suspended in the MS state 415, the PS state 417 or the SS state 419 (step 525), the entire process begins again with the transmission of a header request (step 501) to read and acknowledge tags having different header data than the tags previously read or tags that have entered the excitation field after the reader transmitted its previous header request.

Thus, after the reader has successfully read and acknowledged the electronic bar code for any given tag, it begins to selectively activate a set of tags that were previously suspended. The set of tags that has been selectively activated is a subset of the total population of tags waiting to be read and acknowledged by the reader. Moreover, the set is dependent on the suspended state. This mode of operation reduces the amount of communication between the reader and tag and makes the system more efficient because the tag does not have to transmit and the reader does not have to read and acknowledge data fields that were successfully read and acknowledged by the reader previously.

Figure 6:
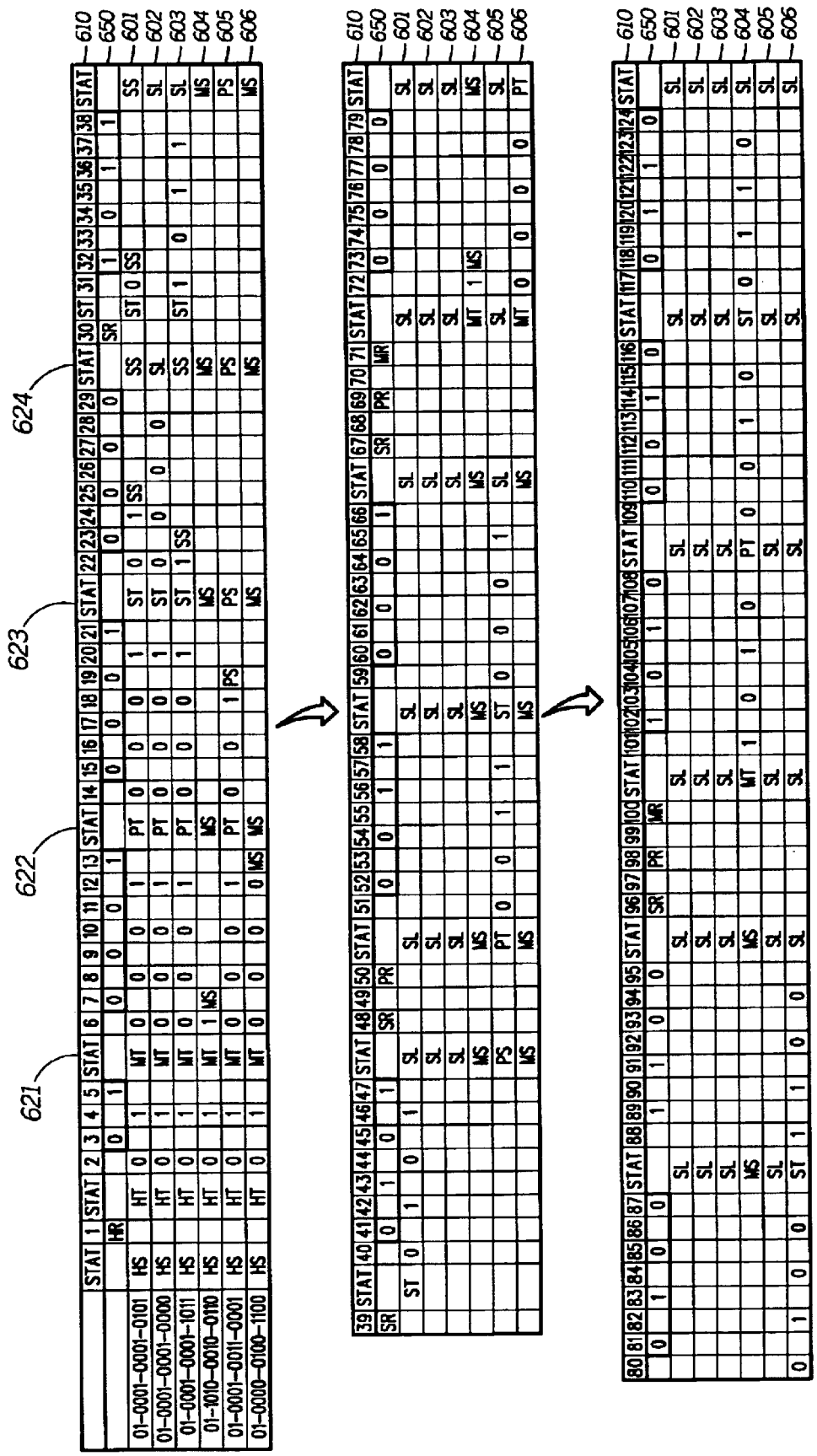
FIG. 6 is an example of a log of a possible communication between an RFID tag and an RFID reader in accordance with the present invention.

At this point in the discussion, it should be understood how the present invention operates from the perspective of the tag and from the perspective of the reader separately. FIG. 6 endeavors to further clarify the process by demonstrating an example of how the tags and the reader interact to successfully complete reading of six tags in the excitation field of the reader. Reader transmissions are shown in row 650. Six tags matching the tags of FIG. 2 are shown in rows 601–606. Row 610 is a time scale listed in time steps. In the preferred embodiment, a time step corresponds approximately to a symbol time. The time steps, however, need not be uniform. Occasionally, the symbol "stat" appears in row 610 indicating the status information for each tag. These columns do not represent elapsed time, but simply show the state of each tag as originally introduced in FIG. 4.

The process starts when the reader transmits an excitation field and the six tags enter the excitation field. Upon entering the excitation field, the tags power-up and initialize in a HS state 401. At time step 1, the reader issues a header request 423 instructing all tags in the HS state 401 to activate and transition to the current transmit state. Since all six tags are currently in the HS state 401, each one transitions to the HT state 403. Each tag transmits its first symbol from its current data field; in this case, each tag transmits its first symbol from its header data 110. For purposes of the example illustrated in FIG. 6, the data represented by the TX SYM and the ACK SYM is represented as a single bit per symbol. Since all six tags have transmitted a "0" bit, the reader acknowledges the "0" bit at time step 3. The algorithm by which the reader chooses a symbol polarity to acknowledge is left to the discretion of the designer of the reader. For example, the reader may be designed to always select a particular symbol polarity over another (i.e., always acknowledge a "0" when both 0's and 1's are present, etc.), or it can select the polarity producing the strongest received signal at the reader.

Each tag compares the data represented by the ACK SYM at time step 3 with the data represented by its TX SYM at time step 2. Since the data represented by the ACK SYM is equivalent to the data represented by the TX SYM for all tags, each tag transmits its next symbol from its header data 110 to the reader at time step 4. All the tags transmit a "1" bit as their next symbol. Since all six tags have transmitted a "1" bit, the reader acknowledges the "1" bit at time step 5. Again, each tag compares the data represented by the ACK SYM at time step 5 with the data represented by its TX SYM at time step 4. Since the data represented by the ACK SYM is equivalent to the data represented by the TX SYM for all tags, each tag transmits its next symbol from its header data 110 to the reader. In this example, however, the header data 110 is only two symbols in length, therefore, all tags have successfully transmitted their header data to the reader, therefore, each tag transitions to the next transmit state (in this example, the MT state 405), as shown in the status column 621. Likewise, the reader has successfully read and acknowledged the header data of at least one tag, therefore it transitions to reading and acknowledging symbols from the manufacturer identifier data field.

Since all the tags are in the MT state 405, each tag continues to transmit its data to the reader. At time step 6, TAGS 1–3 and 5–6 transmit a "0" bit to the reader, while TAG 4 transmits a "1" bit to the reader. At time step 7, the reader acknowledges the "0" bit. Since the data represented by the ACK SYM is equivalent to the data represented by the TX SYM for TAGS 1–3 and 5–6, only TAGS 1–3 and 5–6 transmit the next symbol of their manufacturer identifier to the reader. In the same respect, since the data represented by the ACK SYM is not equivalent to the data represented by the TX SYM for TAG 4, TAG 4 becomes temporarily suspended in its current state (in this case MS state 415) and maintains its data field. The processes of transmit and acknowledge continues through time steps 8–12. At time step 13, however, the data represented by the ACK SYM is not equivalent to the data represented by the TX SYM in time step 12 for TAG 6. As such, TAG 6 is temporarily suspended in its current state (MS state 415), and the remaining tags (TAGS 1–3 & 5–6) transition to the next active state (PT state 407) since they have successfully transmitted their manufacturer identifier 112 to the reader. Likewise, the reader, having read a manufacturer identifier 112, proceeds to read and acknowledge symbols from the product identifier data field. As indicated in status column 622, TAGS 1–3 & 5 are currently active in the PT state 407, while TAGS 4 & 6 are temporarily suspended in the MS state 415.

The processes of transmit and acknowledge continue with TAGS 1–3 & 5 and the reader until time step 19. At time step 19, the data represented by the ACK SYM is not equivalent to the data represented by the TX SYM for TAG 5. As a result, TAG 5 becomes temporarily suspended in its current state (in this case, the PS state 417) and maintains its data field. TAGS 1–3 continue to transmit their remaining data symbols in the product identifier. Since TAGS 1–3 have successfully transmitted their product identifier 114 to the reader, they transition to the next transmit state (now the ST state 409). As shown in the status column 623, TAGS 1–3 are currently active in the ST state 409, TAGS 4 & 6 are temporarily suspended in the MS state 415, and TAG 5 is temporarily suspended in the PS state 417. By now, it can be appreciated that each tag conforms to the rules of the flow diagram of FIG. 3 and the state diagram of FIG. 4. Each tag continues to transmit symbols until the data represented by its TX SYM is not equivalent to the data represented by the ACK SYM transmitted by the reader, at which time the tag becomes temporarily suspended in its current state representing the data field that was being read.

TAGS 1 & 3 become temporarily suspended in the SS state 419 at time steps 23 and 25, respectively, while TAG 2 proceeds to successfully complete its data transmission. As illustrated in status column 624, after TAG 2 completes its data transmission, it enters a SLEEP state and ceases all data transmissions. The reader, on the other hand, copies at least a portion of the data related to a successfully read and acknowledged tag (TAG 2) to its memory and/or passes it on to another device.

After the reader copies and/or passes information related to a successfully read and acknowledged tag, it begins to re-activate the remaining tags in smaller groups depending on the state in which the tag is currently suspended. In this example, the reader issues a serial number request 441 in order to activate the tags temporarily suspended in the SS state 419 at time step 30. All the tags present in the excitation field receive the serial number request 441, however, only TAGS 1 & 3 re-activate since only TAGS 1 & 3 were suspended in the SS state 419; TAGS 4–6 remain temporarily suspended in their respective states.

TAGS 1 & 3 transmit their first symbol of data from the serial number data field at time step 31. It is important to note that TAGS 1 & 3 start data transmission beginning with the first symbol of the serial number data field; thus, when a tag is activated in a given state, it starts data transmission beginning with the first symbol of the data field that was maintained; data transmission does not start at the first symbol of the first data symbol unless the tag is suspended in the first state. The reader, recognizing that there were tags suspended in the SS state 419 since it received data symbols, transmits an ACK SYM in time step 32. The processes of transmit and acknowledge continues as described above. At time step 38, TAG 3 is successfully read and acknowledged by the reader.

At time step 39, the reader issues another serial number request 441, and recognizes that there are still tags suspended in the SS state 419 after receiving the TX SYM from TAG 1 at time step 40. At time step 47, TAG 1 is successfully read and acknowledged by the reader.

At time step 48, the reader issues yet another serial number request 441 in order to determine whether all the tags previously suspended in the SS state 419 are successfully read and acknowledged. Since the reader does not receive a TX SYM from a tag in response to the serial number request 441, the reader re-activates the next group of RFID tags suspended in the next state, if any.

In this example, the reader issues a product request 435 at time step 50, and in response, TAG 5 is re-activated and successfully read and acknowledged at time step 66. Again, the reader issues requests to re-activate tags suspended in a particular state. If the reader does not receive a response to its requests, it issues another request, typically requesting activation of another suspended state, but not limited to such. This process continues until all tags present in the excitation field are successfully read and acknowledged by the reader; TAG 6 is successfully read and acknowledged at time step 95, and TAG 4 is successfully read and acknowledged at time step 124.

Figure 7:
FIG. 7 is an example of a log of an alternative communication between an RFID tag and an RFID reader in accordance with the present invention.

Without going through too much detail, FIG. 7 illustrates another example of reader and tag interaction according to the present invention. FIG. 7 illustrates a very similar example as illustrated in FIG. 6, however, in FIG. 7, the TX SYM is transmitted as two bits per symbol as occurs in quadrature phase shift keying ("QPSK"). As shown in FIG. 7, using QPSK reduces the total number of time steps required to successfully read and acknowledge the six tags to 70 from 124 (as shown in FIG. 6) and from 168 (as in the prior art arbitration system, where 14 time steps for 6 tags with 2 time steps per symbol for read and acknowledge resulting in a read of all 6 tags in 14×6×2=168 time steps).

Figure 8:
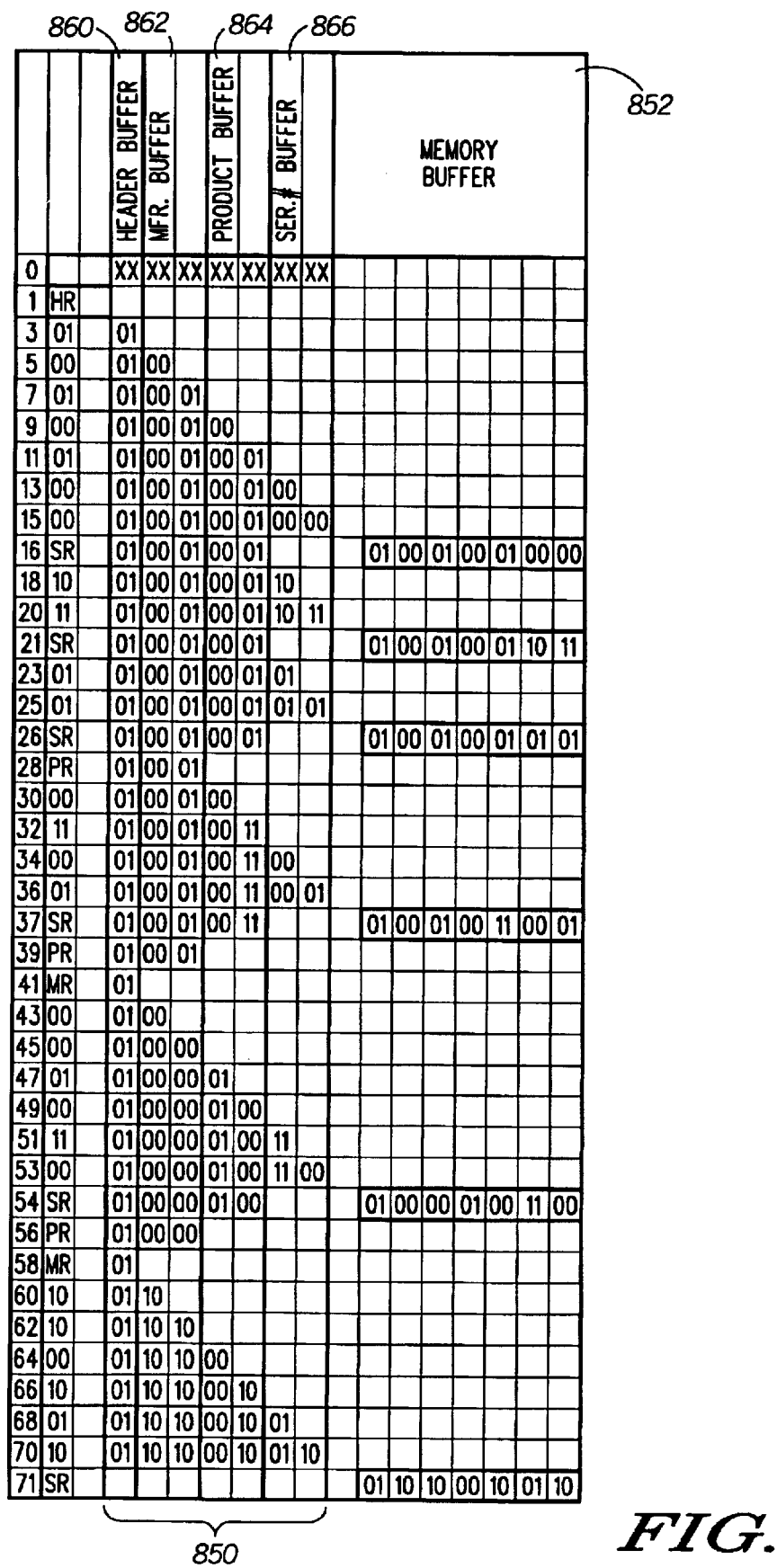
FIG. 8 is a state map of a reader buffer for an RFID reader following the example of FIG. 7 in accordance with the present invention.

FIG. 8 illustrates how a data buffer of the reader can reassemble the tag information in a simple fashion. The ACK SYMs and requests transmitted by the reader in FIG. 7 are used to illustrate the buffer operation for the reader. The reader buffer 850 (comprising a header buffer 860, a manufacturer buffer 862, a product buffer 864, and a serial number buffer 866) is cleared completely by a header request 423. Likewise, a serial number request 441 clears the serial number buffer 866, a product request 435 clears the product buffer 864, and a manufacturer request 429 clears the manufacturer buffer 862. It is important to note that at least portions of the data represented by the TX SYMs are copied in the reader buffer 850 from their most significant bit ("MSB") to their least significant bit ("LSB") with data always being copied in the most significant available buffer location.

In operation, the initial header request 423 clears the buffer. The seven acknowledged data pairs (as illustrated in FIG. 7) are chronologically copied in the reader buffer 850 from MSB to LSB. When the reader buffer 850 fills in time step 15, the reader buffer 850 is copied to a memory buffer 852. This is the identification of the first RFID tag read (i.e., TAG 2). The serial number request 441 in time step 16 clears the serial number buffer 866. The next two data pairs acknowledged in time steps 18 and 20 refills the serial number buffer 866 as the most significant available buffer. At time step 20, the reader buffer 850 is full once again and the contents are copied to memory buffer 852 as the identification of the second tag (i.e., TAG 3). The serial number request 441 followed by the two data pairs in time steps 23 and 25 results in the third tag identification (i.e., TAG 1) to be copied to the memory buffer 852. The serial number request 441 and product request 435 at time steps 26 and 28 result in clearing the serial number buffer 866 and the product buffer 864, respectively.

The next four bit pairs once again fill the reader buffer 850 from MSB to LSB and result in the identification of the fourth tag (i.e., TAG 5) being copied to the memory buffer 852. In time steps 37, 39 and 41, the serial number request 441, the product request 435 and the manufacturer request 429 clear serial number buffer 866, product buffer 864, and manufacturer buffer 862, respectively. Time steps 43–53 illustrate the data for the fifth tag (i.e., TAG 6) filling the reader buffer 850 from MSB to LSB with its identification being copied to the memory buffer 852 when the final bit pair is filled in time step 53. Time steps 54–70 repeat the process for copying the identification for the sixth tag (i.e., TAG 4) into the memory buffer 852.

While the invention has been described in conjunction with specific embodiments thereof, additional advantages and modifications will readily occur to those skilled in the art. For example, the reader may control/solicit data from the tag(s) by leading the data transmissions. The reader will transmit a data symbol, and if a tag can match the data bit, it will acknowledge the data bit and remain active; otherwise, the tag will become temporarily suspended. This loop will continue until the reader has successfully read all the tags. Preferably, the reader knows the number of data fields, and how many symbols in each respective field a priori. Moreover, each tag will keep track of which symbol the reader is transmitting from the total number of symbols that can be sent.

The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:

at a radio frequency identification device comprising a plurality of data fields:
(a) transmitting a data symbol from a data field;
(b) receiving an acknowledgement symbol;
(c) comparing the transmitted data symbol to the received acknowledgement symbol
(d) repeating steps a–c until data transmission is complete as long as each transmitted data symbol is equivalent to a corresponding received acknowledgement symbol; otherwise, maintaining the data field from which the last data symbol was transmitted, and temporarily suspending data transmission;
(e) receiving a request for radio frequency identification devices temporarily suspended in a given data field to resume data transmission; and
(f) the data field that was maintained is equivalent to the given data field identified in the request, repeating steps a–d, starting with a first symbol in the data field that was maintained; otherwise, continuing to temporarily suspend data transmission.

2. The method of claim 1 further comprising the step of maintaining the data field for a predetermined period of time when power is removed from the radio frequency identification device and subsequently re-applied.

3. The method of claim 1 further comprising the step of defaulting to a first data field when power is removed from the radio frequency identification device and subsequently re-applied.

4. The method of claim 1 wherein the radio frequency identification device becomes inactive when data transmission is complete.

5. The method of claim 1 further comprising the steps of:

initializing to a first data field upon power-up;

receiving a request for devices in a given data field to transmit data; and becoming active only if the first data field is equivalent to the given data field identified in the request.

6. A method comprising the steps of:

transmitting a request to activate a set of radio frequency identification devices temporarily suspended in a first field, wherein the radio frequency identification devices comprise a plurality of data fields;

receiving a set of data symbols;

in response to receiving the set of data symbols, transmitting an acknowledgement symbol;

continuing to transmit an acknowledgement symbol in response to each subsequent set of data symbols received; and transmitting at least a second request to activate a set of radio frequency identification devices temporarily suspended in a second fields, wherein the first field is different from the second field.

7. The method of claim 6 further comprising the step of, after the step of transmitting the at least second request, looping through the step of receiving, the second step of transmitting, the step of continuing ad the third step of transmitting.

8. The method of claim 6 further comprising the step of transmitting an excitation signal.

9. The method of claim 8 further comprising the step of clearing at least a portion of the first storage device upon transmitting a request to activate a group of radio frequency identification devices in a given state.

10. The method of claim 8 further comprising the step of copying at least a portion of data represented by each acknowledgement symbol transmitted after the request into the portion of the first storage device that was cleared.

11. The method of claim 6 further comprising the step of copying at least a portion of data represented by each acknowledgement symbol into a storage device.

12. The method of claim 6 further comprising the steps of:
copying at least a portion of data represented by each acknowledgement symbol into a first storage device; and when the first storage device contains a predetermined amount of data, copying the predetermined amount of data into a first location of a second storage device.

13. The method of claim 6 wherein the step of transmitting is performed when a predetermined number of sets of data symbols is received.

14. The method of claim 6 wherein the step of transmitting is performed when a set of data symbols is not received in step b.

* * * * *